United States Patent

Yoshii et al.

[11] Patent Number: 5,879,833
[45] Date of Patent: Mar. 9, 1999

[54] POWER SUPPLY UNIT AND HEAT RADIATION METHOD THEREFOR

[75] Inventors: Fumihiko Yoshii, Neyagawa; Tadao Kimura, Toyohashi; Munehisa Ikoma, Shiki-gun; Manabu Kakino, Uji; Takao Matsunami, Hirakata, all of Japan

[73] Assignee: Matsushita Electric Industrial Co., Ltd., Osaka-fu, Japan

[21] Appl. No.: 859,769

[22] Filed: May 21, 1997

[30] Foreign Application Priority Data

Jun. 12, 1996 [JP] Japan ................................ 8-151405
Jun. 27, 1996 [JP] Japan ................................ 8-167261

[51] Int. Cl.$^6$ .................................................. H01M 10/50
[52] U.S. Cl. .......................... 429/62; 429/152; 429/156; 429/157; 429/148; 429/94; 429/99; 429/72
[58] Field of Search .............................. 429/62, 152, 156, 429/157, 94, 99, 148, 72

[56] References Cited

U.S. PATENT DOCUMENTS

| | | | |
|---|---|---|---|
| 5,385,793 | 1/1995 | Tiedemann et al. | 429/62 |
| 5,456,994 | 10/1995 | Mita | 429/71 |
| 5,585,204 | 12/1996 | Oshida et al. | 429/62 |

FOREIGN PATENT DOCUMENTS

| | | |
|---|---|---|
| 0 109 543 | 5/1984 | European Pat. Off. . |
| 0 177 225 A1 | 4/1986 | European Pat. Off. . |
| 39 42 470 A1 | 6/1990 | Germany . |
| 07326378 | 12/1995 | Japan . |
| 738110 | 10/1955 | United Kingdom . |
| 2 081 000 A | 2/1982 | United Kingdom . |
| 2 206 726 A | 1/1989 | United Kingdom . |

Primary Examiner—Bruce F. Bell
Attorney, Agent, or Firm—Panitch Schwarze Jacobs & Nadel, P.C.

[57] ABSTRACT

A power supply unit of the present invention comprises a group of batteries including plural rows of cells arranged in parallel, each row of cells including plural cylindrical cells connected in series. The power supply unit further comprises refrigerant passages comprising main refrigerant passages exposed to the cells arranged in each row of cells and auxiliary refrigerant passages, the upstream sides of the auxiliary refrigerant passages being isolated from the rows of cells, and the downstream sides thereof being connected to the main refrigerant passages at positions corresponding to the midstream or downstream sides of the rows of cells.

8 Claims, 12 Drawing Sheets

POWER SUPPLY UNIT AND HEAT RADIATION METHOD THEREFOR

BACKGROUND OF THE INVENTION

The present invention relates to a power supply unit comprising a plurality of cells connected in series, capable of supplying electric power having relatively high output voltage and large output current, and suited as an uninterruptible power supply unit, a power supply source for electric vehicles and the like. More particularly, the present invention relates to heat radiation means and a heat radiation method for the power supply unit.

As a power supply source with high output voltage and large capacity, a power supply unit including several tens to hundreds of connected cells has been proposed. In this kind of power supply unit, plural cells are required to be closely arranged in order to enhance space efficiency. For this purpose, several to several tens of cells electrically connected in series are arranged in a row and a plurality of the rows of cells are arranged in parallel in the vertical and horizontal directions by using battery holding members.

Figure 14:
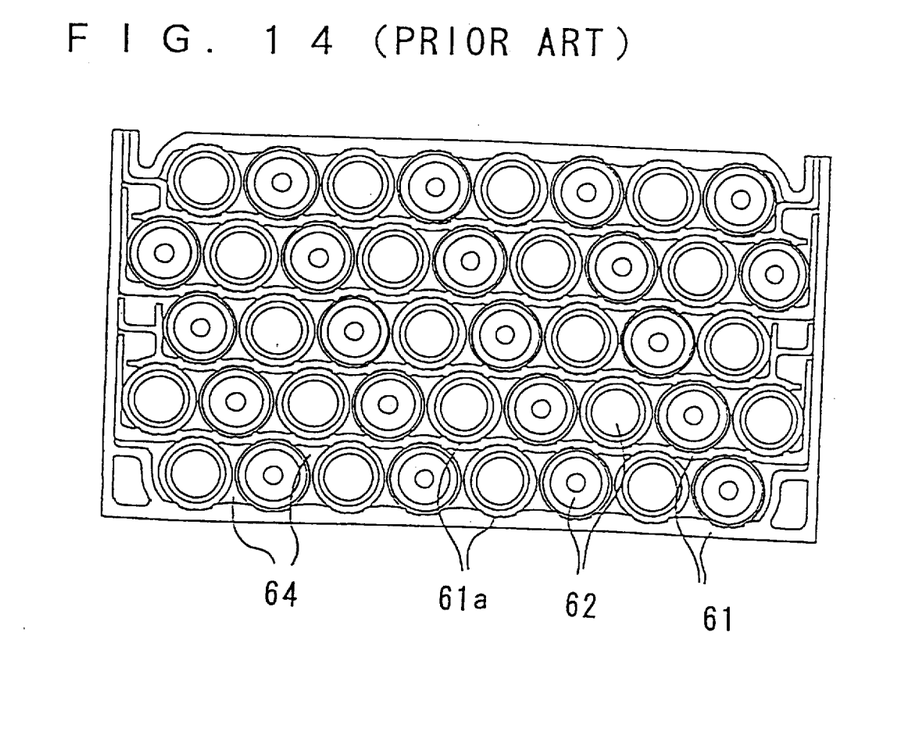
FIG. 14 is a front view showing a power supply unit in a comparative example.

FIG. 14 shows an example of a conventional power supply unit. In this power supply unit, battery holding members 61 made of a synthetic resin, e.g., polypropylene, and having a function of holding plural rows of cells in the horizontal direction are laminated and mutually joined by thermowelding or by using an adhesive so as to be secured. A plurality of cylindrical cells 62 are connected in series in the axial direction thereof to form the row of cells. This row of cells is accommodated in a battery holding portion 61a of the battery holding member 61. The cells 62 at the leading or trailing ends of the rows of cells are mutually connected electrically, although the connections are not shown. The synthetic resin is used as a material of the battery holding member 61 in order to prevent short-circuit between the cells 62 and to obtain high processability.

However, in the case where several tens to hundreds of cells are connected as described above, the cells disposed inside a group of batteries including a plurality of the rows of cells are exposed to stagnant heat inside because of heat transfer from adjacent batteries and the like, and the temperatures of the cells disposed inside become higher than the temperatures of the cells disposed outside. If such a temperature difference occurs among the cells in the group of batteries, variations are apt to occur among the cells in their charge/discharge characteristics. Such variations reduce the reliability of the power supply unit. In order to prevent temperature rise due to heat generation at the cells 62, a method of cooling the cells 62 has been taken, wherein a refrigerant, such as air, is passed through space portions 64 between the rows of cells.

However, in the case where a plurality of the cells are arranged continuously in the flowing direction of the refrigerant, the refrigerant absorbs heat from the cells positioned on the upstream side, and the temperature of the refrigerant rises. This temperature rise decreases the efficiency of cooling the cells positioned on the downstream side. As a result, the temperatures of the cells positioned on the downstream side become relatively higher than those of the cells positioned on the upstream side.

BRIEF SUMMARY OF THE INVENTION

The present invention provides a highly reliable power supply unit having small variations in characteristics among cells by decreasing temperature difference among cells.

A power supply unit of the present invention comprises: a group of batteries including plural rows of cells arranged in parallel, the row of cells including plural cylindrical cells connected in series; and refrigerant passages for passing a refrigerant through space portions formed between the rows of cells, wherein the refrigerant passages comprise: main refrigerant passages exposed to the cells arranged in the row of cells; and auxiliary refrigerant passages, the upstream sides of the auxiliary refrigerant passages being isolated from the rows of cells, and the downstream sides thereof being connected to the main refrigerant passages at positions corresponding to the midstream or downstream sides of the rows of cells.

Another power supply unit of the present invention comprises: a group of batteries including plural rows of cells arranged in parallel, the row of cells including plural cylindrical cells connected in series; and cooling means for passing a battery cooling refrigerant through space portions formed between the rows of cells, wherein cross-sectional areas of the space portions on the downstream side are made smaller than the cross-sectional areas of the space portions on the upstream side with respect to the flowing direction of the refrigerant.

Still another power supply unit of the present invention comprises: a group of batteries including plural rows of cells arranged in parallel, the row of cells including plural cylindrical cells connected in series; and cooling means for passing a battery cooling refrigerant through space portions formed between the rows of cells, wherein surface areas of the cells exposed to the refrigerant on the downstream side of the rows of cells are larger than the surface areas of the cells exposed to the refrigerant on the upstream side.

Yet still another power supply unit of the present invention comprises: a group of batteries including plural rows of cells arranged in parallel at predetermined intervals, the row of cells including plural cylindrical cells connected in series; and cooling means for passing a battery cooling refrigerant through space portions formed between the rows of cells, wherein the interval between the rows of cells at the central portion of a cross-sectional plane perpendicular to the arrangement direction of the row of cells is larger than the interval between the rows of cells adjoining each other at the peripheral portion.

A further power supply unit of the present invention comprises: rows of cells, the row of cells including plural cylindrical cells connected in series; and battery holding members for holding a plurality of the rows of cells in parallel, wherein the battery holding members are made of a metal and have an insulation layer on a surface making contact with the rows of cells.

Furthermore, it is preferable that the rows of cells are provided with insulation layers on surfaces thereof making contact with the battery holding members.

Moreover, it is preferable that the battery holding member is provided with radiation portions exposed to the outside or the refrigerant passages provided between the rows of cells.

A heat radiation method of the power supply unit in accordance with the present invention is applied to a power supply unit comprising a group of batteries including plural rows of cells arranged in parallel, the row of cells including plural cylindrical cells connected in series. This method comprises steps of passing a refrigerant through space portions formed between the rows of cells in the direction of the rows of cells in order to cool the cells in the rows, and separately passing the refrigerant only at positions corresponding to the midstream or downstream side of the rows of cells and thereafter.

Another heat radiation method of the power supply unit in accordance with the present invention is applied to a power supply unit comprising a group of batteries including plural rows of cells arranged in parallel, the row of cells including plural cylindrical cells connected in series. This method comprises a step of passing a refrigerant through space portions formed between the rows of cells in the direction of the rows of cells, wherein surface areas of the cells exposed to the refrigerant on the upstream side of the rows of cells are made smaller than surface areas of the cells exposed to the refrigerant at positions corresponding to the midstream or downstream side of the row of cells and thereafter.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Examples in accordance with the present invention are detailed below referring to drawings.

EXAMPLE 1

Figure 1:
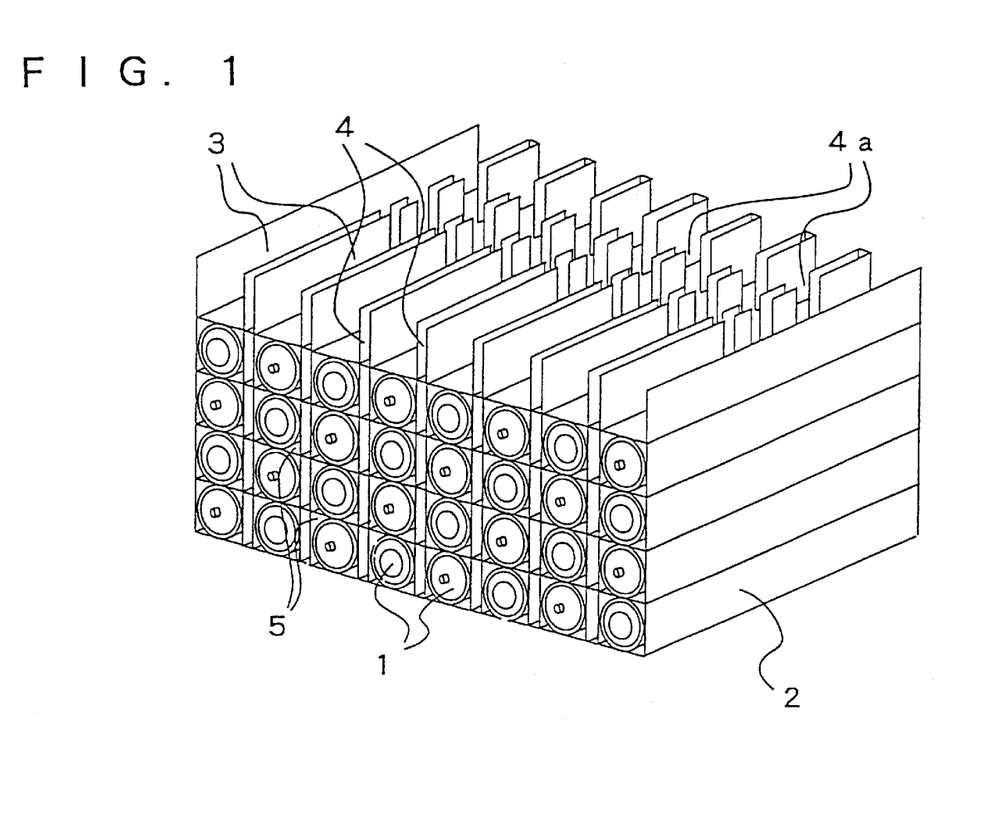
FIG. 1 is a perspective view of a power supply unit in one example of the present invention.
Figure 2:
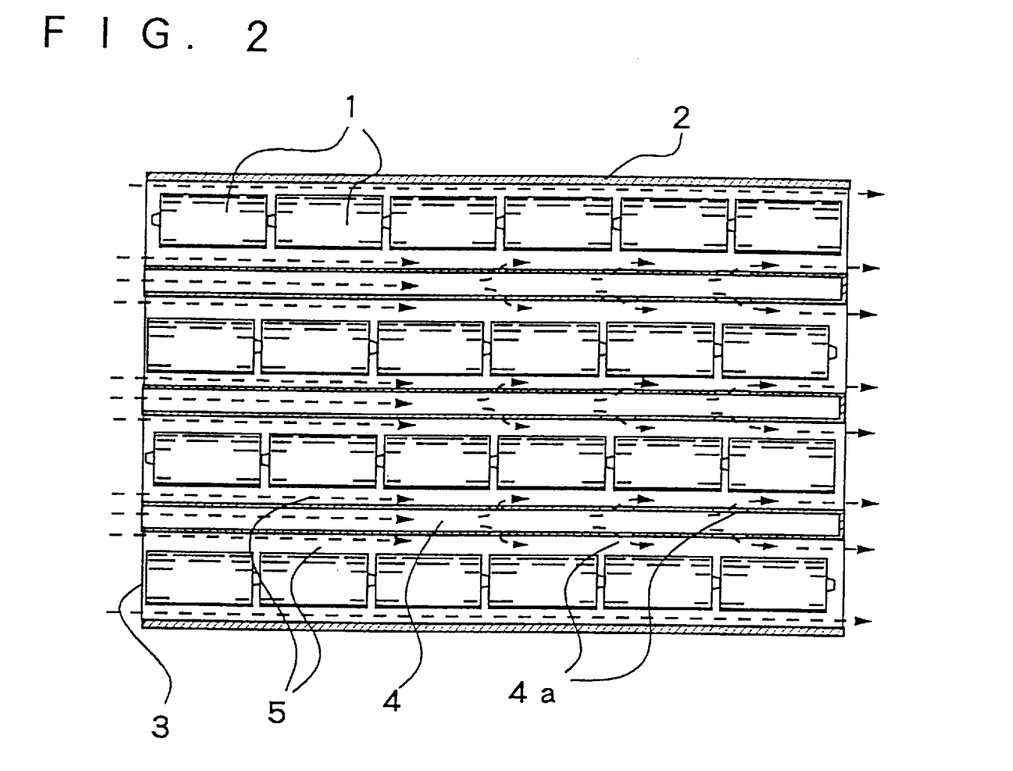
FIG. 2 is a side sectional view showing cooling means of the power supply unit.

A power supply unit of the present example 1 is shown in FIG. 1 and FIG. 2.

In each partitioned battery holding portion 3 of a battery holding member 2, a plurality of cylindrical cells 1 are arranged in a row with their axial directions aligned and electrically connected in series to form a row of cells. A plurality of the rows of cells are arranged in the vertical and horizontal directions, thereby forming a group of batteries. A main refrigerant passage 5 is formed by space portion between side walls of the battery holding portion 3 and the row of cells. An auxiliary refrigerant passage 4 is formed between every two adjacent battery holding portions 3 positioned in the horizontal direction.

When a refrigerant such as air is supplied to the group of batteries in the directions indicated by arrows as shown in FIG. 2, the refrigerant flows into the main refrigerant passages 5 and the auxiliary refrigerant passages 4.

The refrigerant flowed into the main refrigerant passages 5 cools all cells 1 in the rows of cells arranged in the battery holding portions 3. In addition, the refrigerant flowed into the auxiliary refrigerant passages 4 merges with the refrigerant flowing through the main refrigerant passages 5 by virtue of slits 4a formed in the midstream and downstream of the refrigerant. Since the refrigerant flowed into the main refrigerant passage 5 absorbs heat generated in the cells 1 as flowing toward the downstream, the temperature of the refrigerant rises gradually. Therefore, the efficiency of cooling the cells 1 is also gradually lowered. To solve this problem, a new refrigerant, which has been isolated from the cells 1 and has not been used to cool the cells 1, is supplied from the auxiliary refrigerant passages 4 and merged with the main refrigerant passages 5 in the midstream and downstream. This method lowers the temperature of the refrigerant and increases the efficiency of cooling the cells 1 in the midstream and downstream sides of the rows of cells.

Furthermore, the cross-sectional area of the refrigerant passage becomes substantially smaller in the downstream side of the refrigerant passage, thereby increasing a velocity of the refrigerant flow. This further increases the cooling efficiency.

The above-mentioned actions can suppress a rise of temperatures of the cells 1 in the downstream side of the rows of cells, thereby reducing temperature differences in the directions of the rows of cells. Consequently, variations in the charge/discharge and life characteristics of the cells due to temperature difference can be suppressed. Therefore, it becomes possible to obtain a power supply unit having a high stability.

By the way, the auxiliary refrigerant passage can have cylindrical or other forms. In addition, the number of the auxiliary refrigerant passages and their positions can be changed as desired depending on working environmental conditions and the like.

EXAMPLE 2

Figure 3:
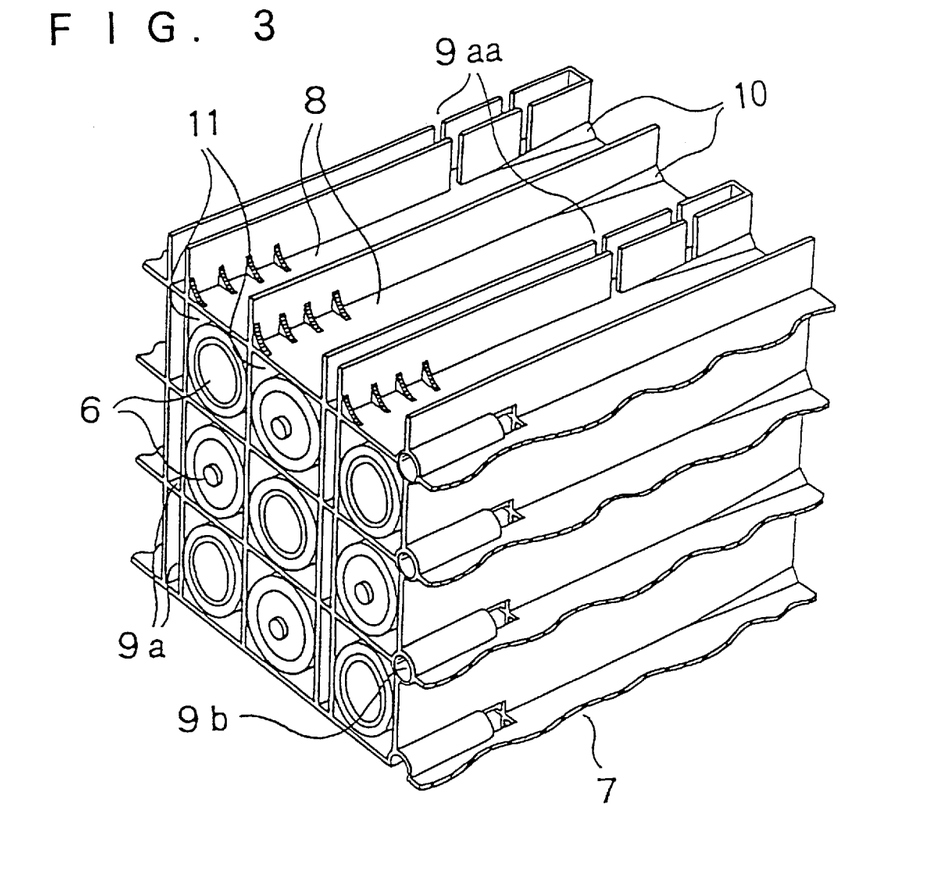
FIG. 3 is a perspective view, partially broken away, showing a power supply unit in an another example of the present invention.

A power supply unit of the present example is shown in FIG. 3.

A row of cells in which plural cells 6 are connected in series is disposed in a battery holding portion 8 of a battery holding member 7. The space portions in the battery holding portion 8 accommodating a row of cells function as main refrigerant passages 11. A refrigerant flowed into the main refrigerant passages 11 cools all the cells 6 constituting the row of cells. In addition, another refrigerant flowed into a slit-like auxiliary refrigerant passage 9a formed between the battery holding portions 8 disposed in the horizontal direction is isolated from the cells 6 arranged in the upstream side of the row of cells, as same as the one in Example 1. In the midstream and the following stream sides of the row of cells, the refrigerant flows from slits 9aa into the main refrigerant passages 11 in a state of being kept low in temperature. Furthermore, the refrigerant flowed into a duct-like auxiliary refrigerant passage 9b is isolated from the cells 6 arranged in the upstream side of the row of cells, and flows into the main refrigerant passages 11 in a state of being kept low in temperature.

In a case of the power supply unit having the slit-like auxiliary refrigerant passages 9a, there is a fear of reducing an efficiency of space for accommodating the cells 6, although the passages can be made easily. On the other hand, in a case of the power supply unit having the duct-like auxiliary refrigerant passages 9b, since those can be formed in spaces between the rows of cells, the space efficiency is not lowered. In the present example, both the duct-like and slit-like auxiliary refrigerant passages are used. However, it is possible to constitute the auxiliary refrigerant passages only by the duct-like auxiliary refrigerant passages.

Furthermore, pieces 10 are formed at the corners of the battery holding portion 8 on the downstream side so as to gradually reduce the cross-sectional area of the main refrigerant passages 11 along the downstream. With this structure, velocity of the refrigerant flowing through the main refrigerant passages 11 can be increased, thereby increasing the efficiency of cooling the cells 6 on the downstream side of the row of cells.

EXAMPLE 3

Figure 4:
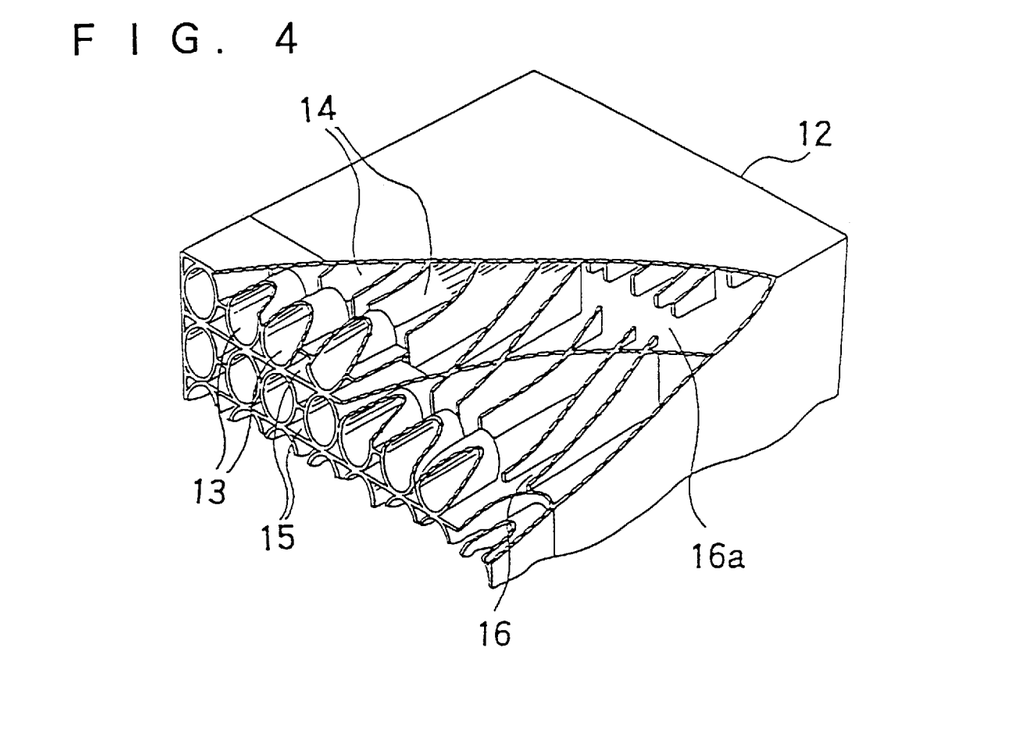
FIG. 4 is a perspective view, partially broken away, showing a power supply unit in a still another example of the present invention.

FIG. 4 shows a battery holding member of a power supply unit of the present example.

This battery holding member 12 is effective in decreasing a temperature gradient in a group of batteries and in preventing cells disposed on the upstream sides of refrigerant passages from being over-cooled depending on the working environmental conditions of the power supply unit.

Cylindrical cell protecting portions 13 having an inside diameter coinciding with an outside diameter of a cylindrical cell to be disposed therein are formed on the upstream sides of refrigerant passages of the battery holding member 12. Cylindrical cells are arranged in a row in the battery protecting portion 13 and battery holding portion 14 disposed on the downstream side of the battery protecting portion 13. An auxiliary refrigerant passage 16 having slits 16a similar to those of Example 1 is formed on the downstream side from the battery protecting portion 13. A refrigerant flows into the group of batteries from open refrigerant entry portions 15 of space portions formed between the battery protecting portions 13 formed in parallel. The cells on the upstream sides of the rows of cells are closely covered at their circumferential surfaces by the battery protecting portions 13. Therefore, the surface areas of the cells on the upstream side are less exposed to the flowing refrigerant. Therefore, thus covered cells are less cooled and their temperatures are less lowered. The refrigerant flowed into the battery holding member 12 passes through the space portions formed between the battery protecting portions 13, flows and branches to main refrigerant passages formed by the space portions in the battery holding portion 14 and auxiliary refrigerant passages 16. Since the refrigerant flowed into the main refrigerant passages absorbs less amount of heat on the upstream side of the rows of cells, the temperature of the refrigerant rises less when the refrigerant reaches the cells on the midstream and downstream sides. Consequently, cooling efficiency is increased in the midstream and downstream.

In addition, by providing the auxiliary refrigerant passages 16, the cooling efficiency for the cells disposed on the downstream side can be increased because of an effect similar to that obtained by Example 1.

The above-mentioned structure can reduce a temperature difference between the cells on the upstream side and the cells on the downstream side, and can prevent the cells on the upstream side from being over-cooled.

EXAMPLE 4

Figure 5A:
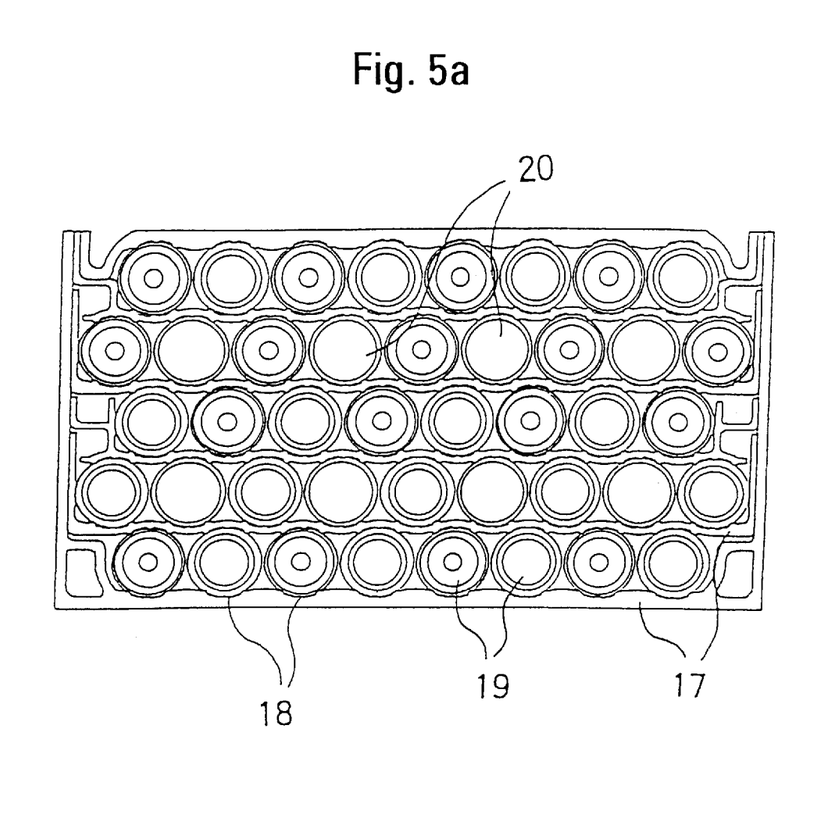
FIG. 5A is a front view showing a power supply unit in a still another example of the present invention.

FIG. 5A shows a general view of a power supply unit of the present example. A battery holding member 17 used for this power supply unit is similar to a conventional battery holding member shown in FIG. 14, and is made of a synthetic resin such as polypropylene. A plurality of battery holding members 17 having a shape of corrugated plate are laminated, and their ends are joined by thermowelding or the like. Just as in the case of Example 1, a plurality of cells 19 are connected in series to form a row of cells. A plurality of these rows of cells are partitioned by corrugated battery holding portions 18 of the battery holding member 17 in the horizontal direction and arranged in parallel so as to three-dimensionally form a group of batteries.

Figure 5B:
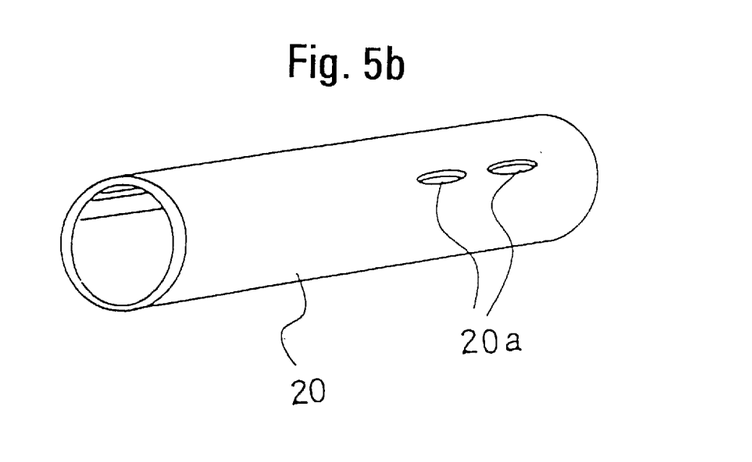
FIG. 5B is a perspective view showing an adaptor used for the power supply unit.

The power supply unit of this example is obtained by replacing rows of cells accommodated at predetermined positions in the battery holding portions 18 with adaptors 20 shown in FIG. 5B.

The adaptor 20 is a cylinder having one closed end, and its external shape is generally made identical to that of the row of cells. In addition, its circumferential wall is provided with through holes 20a at the central and closed bottom side portions thereof.

These adaptors 20 are arranged together with the rows of cells in the battery holding members 17, with the closed ends of the adaptors 20 directed toward the downstream side of the refrigerant flowing direction. With this arrangement, the adaptors 20 can function just as the auxiliary refrigerant passages in Example 1.

With this method, no special structure is required for cooling. By simply using the adaptors 20, the conventional battery holding member can be used as it is.

In addition, the cells disposed inside the group of batteries, which are apt to be heated by stagnant heat, can be cooled effectively by more densely disposing the adaptors 20 inside the group of batteries.

Furthermore, this method can be easily applied to various working environmental conditions by changing the number of adaptors 20 to be replaced with the rows of cells.

EXAMPLE 5

Figure 6:
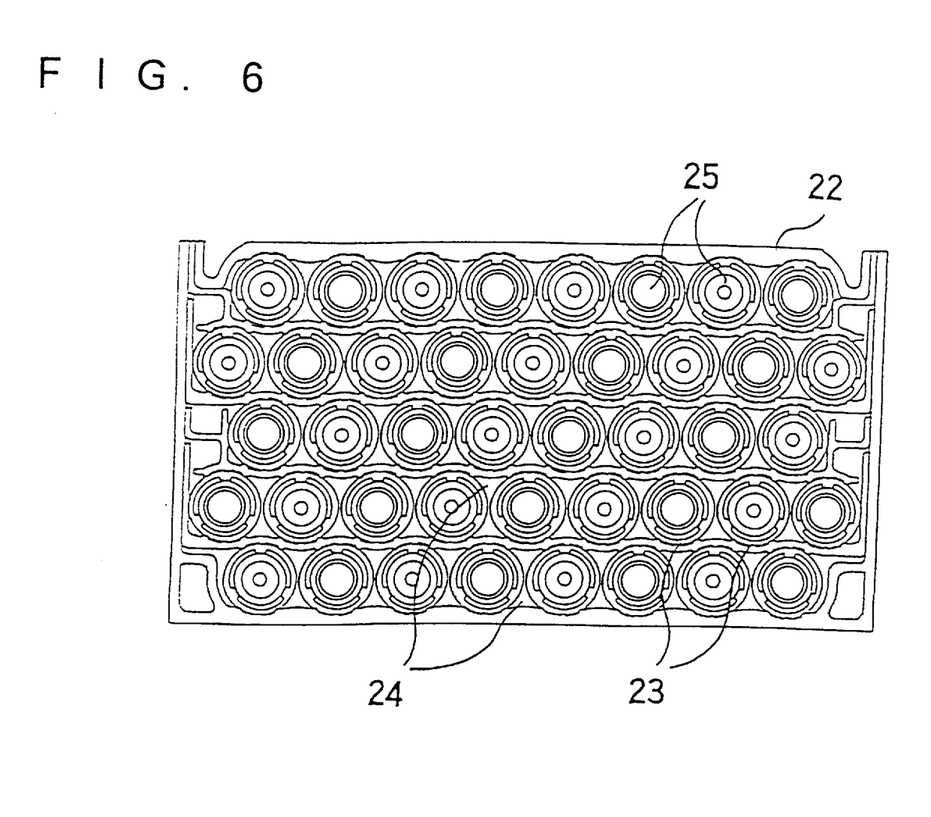
FIG. 6 is a front view showing a power supply unit in a further example of the present invention.
Figure 7A:
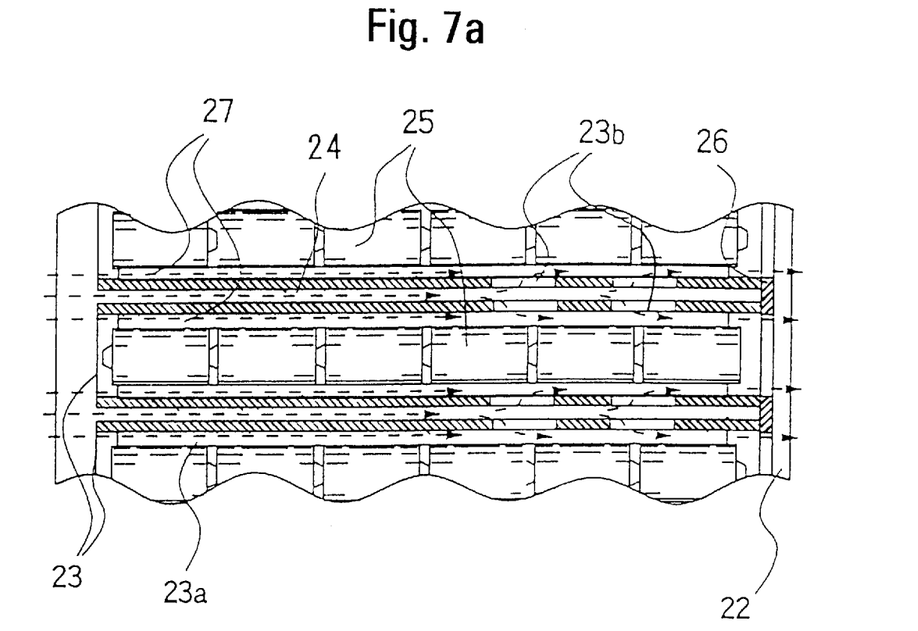
FIG. 7A is a side sectional view showing cooling means of the power supply unit.

A power supply unit of the present example is described below referring to FIG. 6, FIG. 7A and FIG. 7B. A conventional battery holding member similar to the one used in Example 4 can also be used in the power supply unit of the present example.

Figure 7B:
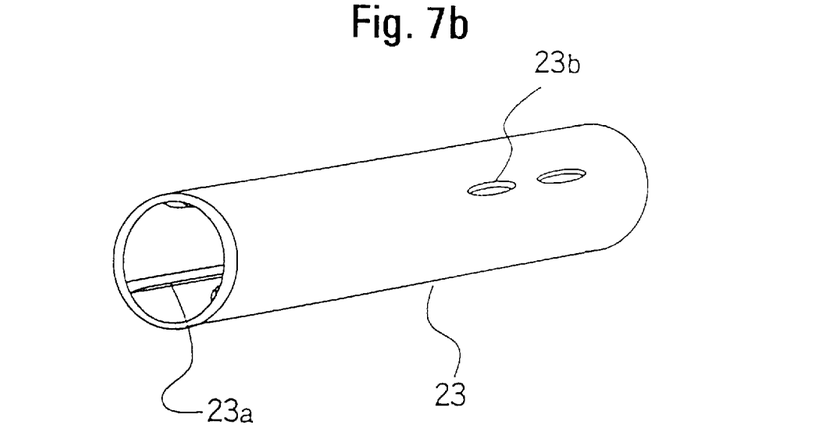
FIG. 7B is a perspective view showing an adaptor used for the power supply unit.

A row of plural cells 25 connected in series is accommodated in a cylindrical adaptor 23 which is open at both ends thereof as shown in FIG. 7B. Projections 23a are formed on the inside surface of the adaptor 23 in the axial direction thereof as shown in FIG. 7A. Main refrigerant passages 27 are formed by space portions between the inside wall of the adaptor 23 and the cells 25 as shown in FIG. 7A. Furthermore, through holes 23b are formed in the circumferential wall of the adaptor 23 at the central and bottom side portions thereof.

Portions of the battery holding member 22 excluding portions making contact with the downstream end of the adaptor 23 are closed by sealing portions 26. A refrigerant passing through the outside spaces of the adaptor 23, that is, auxiliary refrigerant passages 24, flows into the adaptor 23 from the through holes 23b, since the downstream end portion is sealed. The refrigerant cools the cells 25 disposed at the midstream and downstream sides of the row of cells, and then the refrigerant is discharged outside the power supply unit.

EXAMPLE 6

Figure 8:
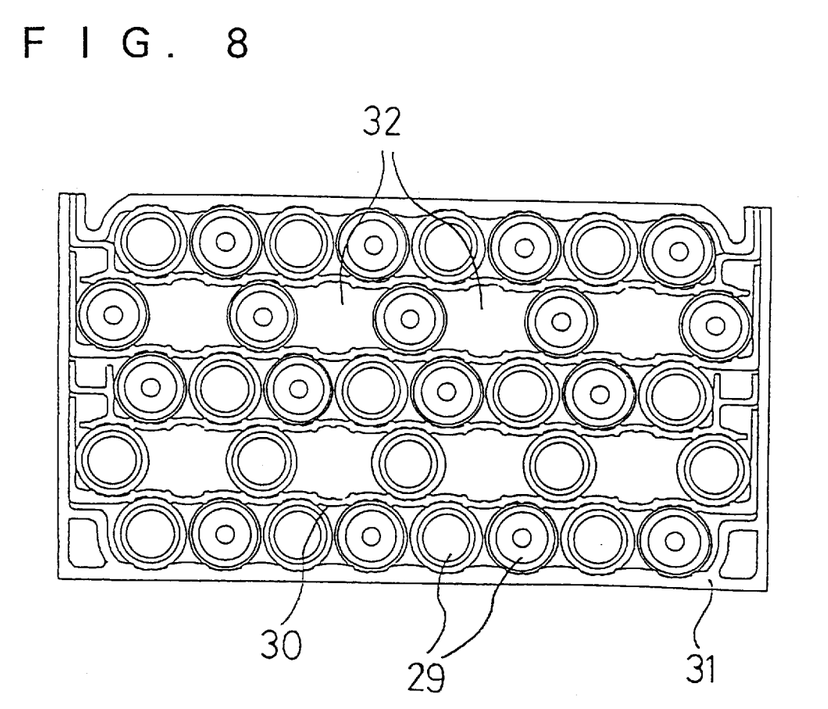
FIG. 8 is a front view showing a power supply unit in a still further example of the present invention.

FIG. 8 shows a power supply unit in the present example. A heat radiation means of this power supply unit decreases temperature difference in the direction perpendicular to the rows of cells 29 connected in series.

In a case a group of batteries including plural rows of cells arranged in parallel at constant intervals in the vertical and horizontal directions, stagnant heat is apt to remain at the central portion of the group of batteries, and the temperatures of the cells tend to rise.

On the other hand, in a case of a structure shown in FIG. 8, space portions 32 are formed by not accommodating the rows of cells in battery holding portions 30 at desired positions at the central portion of a battery holding member 31 in a plane perpendicular to the rows of cells constituting the group of batteries. By passing a refrigerant flows through the space portions 32 formed between the rows of cells constituting the group of batteries so as to increase a cooling efficiency at the central portion wherein stagnant heat is apt to remain. This can suppress a rise in temperature at the central portion in the plane.

This power supply unit uses battery holding members similar to those used in Example 4. As described above, a temperature difference in the group of batteries can be reduced by using a simple structure.

The battery holding member of the present example has a simple structure as described above. However, an effect similar to that obtained by using the battery holding member can also be obtained by using a battery holding member similar to those used in the power supply units of Examples 1 to 5, provided that the sizes of the space portions between the rows of cells at the central portion are made larger than those at the peripheral portion.

Comparative Example

A power supply unit shown in FIG. 14 is used as a comparative example. In the power supply unit, rows of cells 62 are arranged in a battery holding member 61 similar to those used in Example 4 and Example 6. A refrigerant passes in the direction of the rows of cells.

The power supply units of Examples 1 to 6 and Comparative Example were examined as described below with respect to temperature distribution during operation. In each power supply unit used for the examination, six identical cells formed a row, and totally 40 rows of cells were arranged in parallel. Each battery holding member was made of polypropylene and had a wall thickness of about 3 mm.

The group of batteries of each power supply unit was charged at 1 A at 24° C. When the surface temperatures of the cells reached 50° C., a fan was activated to flow air at a flow rate of 3 liters/cm$^2$ in the direction of the rows of cells constituting the group of batteries. The surface temperatures of the cells were measured two hours after the start of the fan operation.

The cells disposed at the second row from the outermost row were measured. Thermocouples were used to measure surface temperatures of cells located at 50 mm (point 1), 170 mm (point 2), 260 mm (point 3) and 340 mm (point 4) in the direction from the upstream end to the row of cells having a length of 370 mm.

Figure 9:
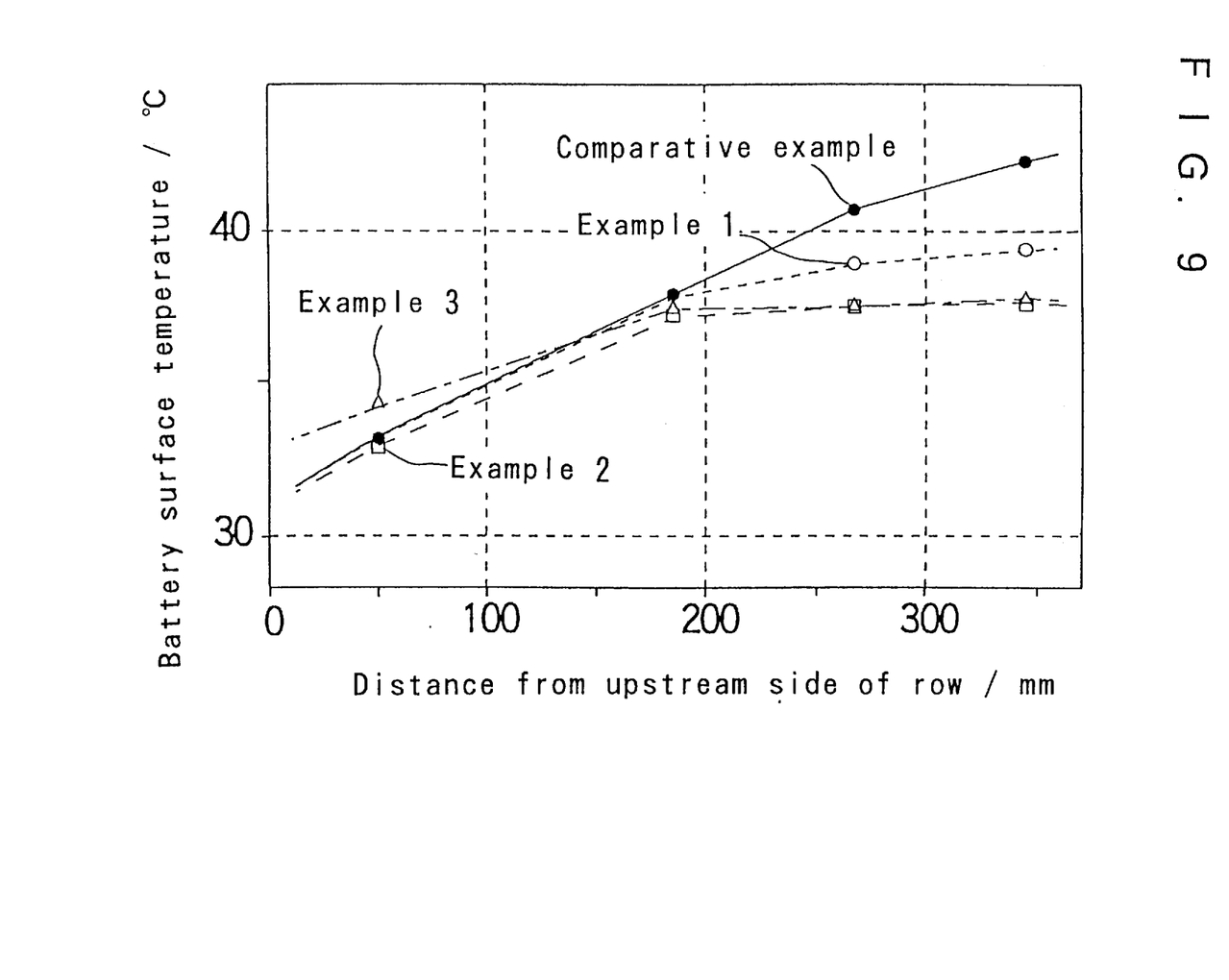
FIG. 9 is a characteristic diagram showing cell temperature distribution in the direction of the rows of cells of the power supply units in the examples of the present invention.
Figure 10:
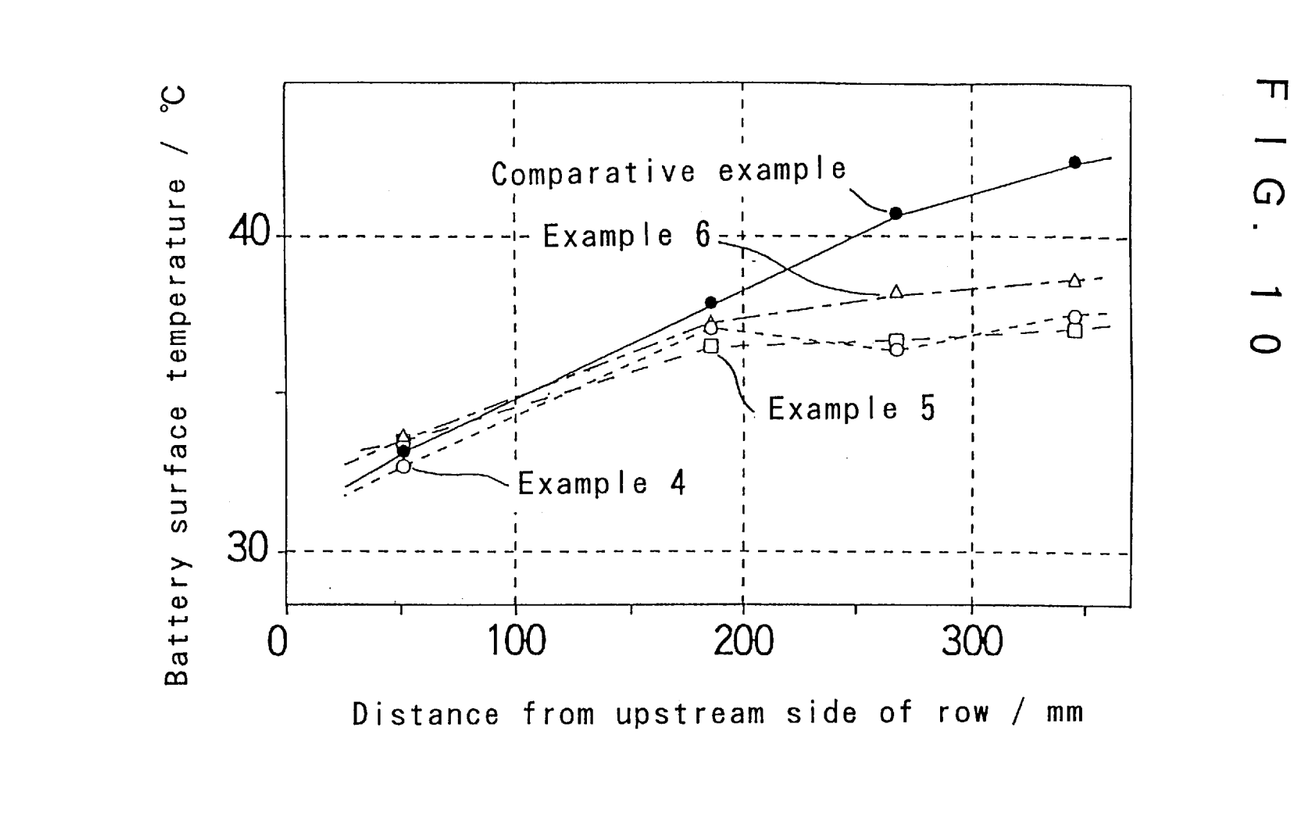
FIG. 10 is a characteristic diagram showing battery temperature distribution in the direction of the rows of cells of the power supply units in the examples of the present invention.

FIGS. 9, FIG. 10 and TABLE 1 show the results of the measurement.

TABLE 1

| | Cell temperature (°C.) | | | | |
| --- | --- | --- | --- | --- | --- |
| | Point 1 | Point 2 | Point 3 | Point 4 | Temperature difference |
| Example 1 | 33.2 | 37.9 | 38.9 | 39.4 | 6.2 |
| Example 2 | 32.9 | 37.2 | 37.5 | 37.6 | 4.7 |
| Example 3 | 34.4 | 37.5 | 37.6 | 37.8 | 3.4 |
| Example 4 | 32.7 | 37.1 | 36.4 | 37.5 | 4.8 |
| Example 5 | 33.5 | 36.5 | 36.7 | 37.1 | 3.6 |
| Example 6 | 33.7 | 37.3 | 38.3 | 38.7 | 5.0 |
| Comparative example | 33.2 | 37.9 | 40.7 | 42.3 | 9.1 |

According to the result, in the case of the power supply unit of the Comparative Example, the surface temperatures of the cells on the downstream side of the group of batteries exceeded 40° C., and temperature difference between the cells located at the upstream and the downstream was about 9° C. In the case of the power supply unit of each Example in accordance with the present invention, the temperature difference can be suppressed to about half the temperature difference in the case of the power supply unit of the Comparative Example. Even if the power supply unit of Example 3 wherein the surfaces of the cells on the upstream side of the group of batteries are covered with the battery protecting portions, the surface temperatures of the cells on the upstream side are not greatly different from those of the cells in the power supply units of other examples. In particular, the temperature difference between the upstream and the downstream is smaller than those in the power supply units of other examples. It is assumed that this can be attained because of the following reason. The cells on the upstream side are directly cooled at lower efficiency. On the other hand, the cells on the midstream and downstream sides are cooled at higher efficiency oppositely related to the lower efficiency of the cells on the upstream side. Consequently, the cells on the upstream side are cooled by heat transfer between the cells connected to each other. As described above, rise in temperature of the cells can be suppressed, and the temperature difference among the batteries can also be lowered in the power supply units of all examples.

EXAMPLE 7

The above-mentioned examples were used to examine structures of battery accommodation units. Example 7 is used to examine materials of the accommodation units.

An insulation layer made of a fluorocarbon resin or the like is formed on the surface of a plate-like substrate made of a metal superior in heat conductivity, such as zinc, iron or aluminum. The insulation layer can be formed by any desired method. In a case aluminum is used as a material, the aluminum may be subjected to alumite processing in which an aluminum oxide layer is formed on the surface thereof.

It is also possible to use a commercially available material which is a metal plate having already been coated with an insulation layer ("VINYEVER" made by Daido Steel Sheet Corporation, for example).

The insulation layer formed on the surface of the metal substrate prevents short-circuits between the cells. In addition, the insulation layer enhances the corrosion resistance of the battery holding member at the portions thereof making contact with the cells and at the portion exposed to the refrigerant passages or outside thereof.

Figure 11:
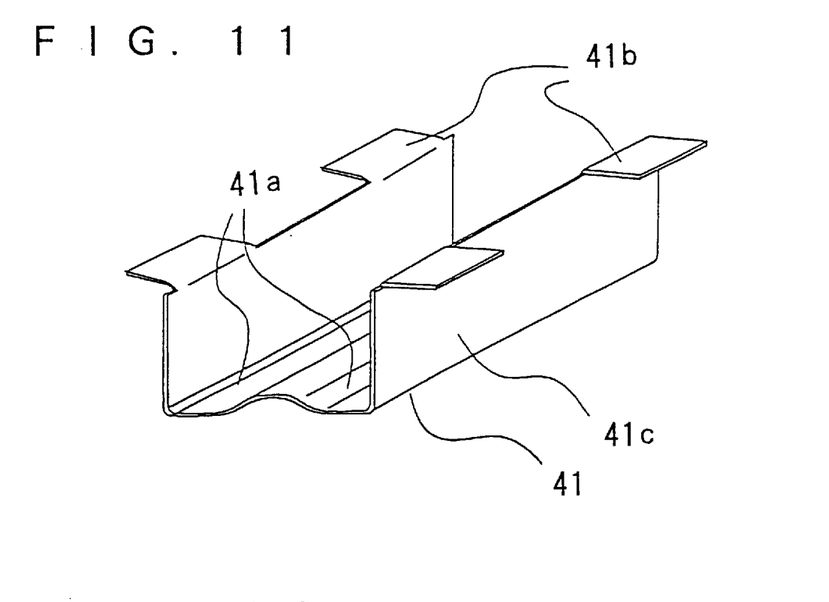
FIG. 11 is a perspective view showing a battery holding member used for a power supply unit in a yet still further example of the present invention.

A metal plate having an insulation layer on the surface thereof as describe above is processed to have a shape shown in FIG. 11, thereby obtaining a battery holding member 41 used to hold cells. In the battery holding member 41 shown in FIG. 11, two rows of cells (each row including six cells connected in series) can be arranged in parallel in the battery holding portions 41a disposed inside a pair of side walls 41c.

A predetermined number of battery holding members 41 are arranged in the vertical and horizontal directions. Tab portions 41b of these battery holding members 41 are mutually joined by welding, riveting or the like. The battery holding members 41 disposed at the right and left ends are each secured to a side plate 44. A power supply unit shown in FIG. 12 can be obtained by accommodating cells 45 in the battery holding members 41. In actual practice, the accommodated rows of cells are electrically connected, although the connections are not shown.

Figure 12:
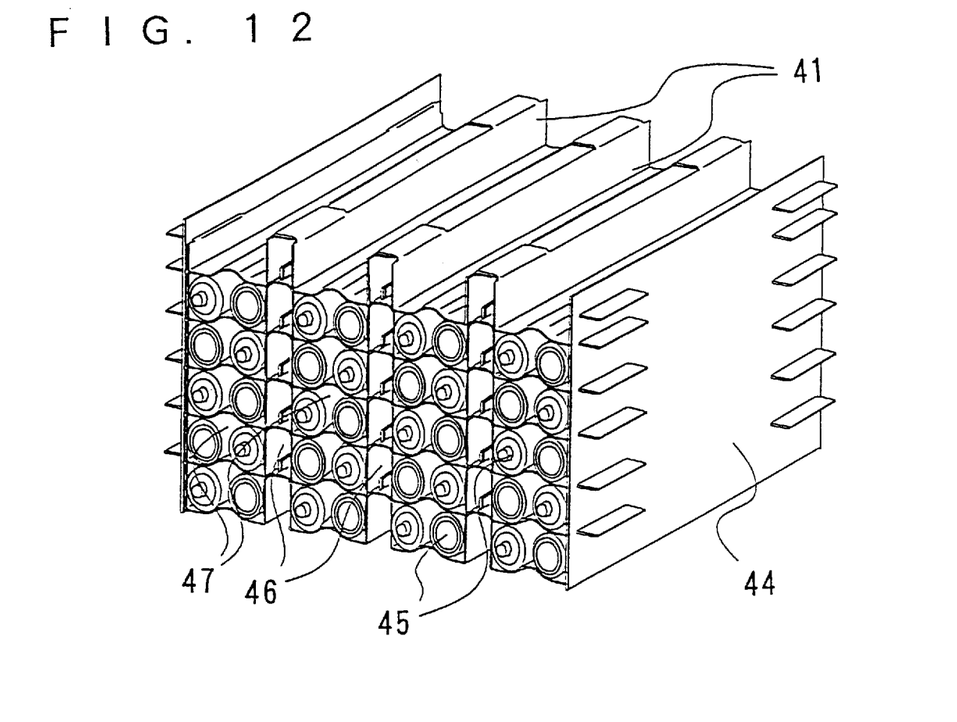
FIG. 12 is a perspective view of the power supply unit.

When a metal having high heat conductivity is used for the battery holding members 41 of the power supply unit, heat generated in the cells 45 can be promptly transferred to the battery holding members 41. In addition, temperature difference in the battery holding members 41 is decreased because of the superior heat conductivity of the battery holding members 41, thereby decreasing temperature difference among the cells 45. Furthermore, the power supply unit has refrigerant passages 46 formed by the side walls 41c of the battery holding members 41 mutually joined. A refrigerant passes through space portions 47 in the battery holding members 41 in the direction of the rows of cells, and also passes the refrigerant passages 46. The cells 45 are cooled by the refrigerant having flowed into the space portions 47. Additionally, the side walls 41c of the battery holding members 41 are exposed to the refrigerant passages 46 and function as heat radiation portions.

Figure 13:
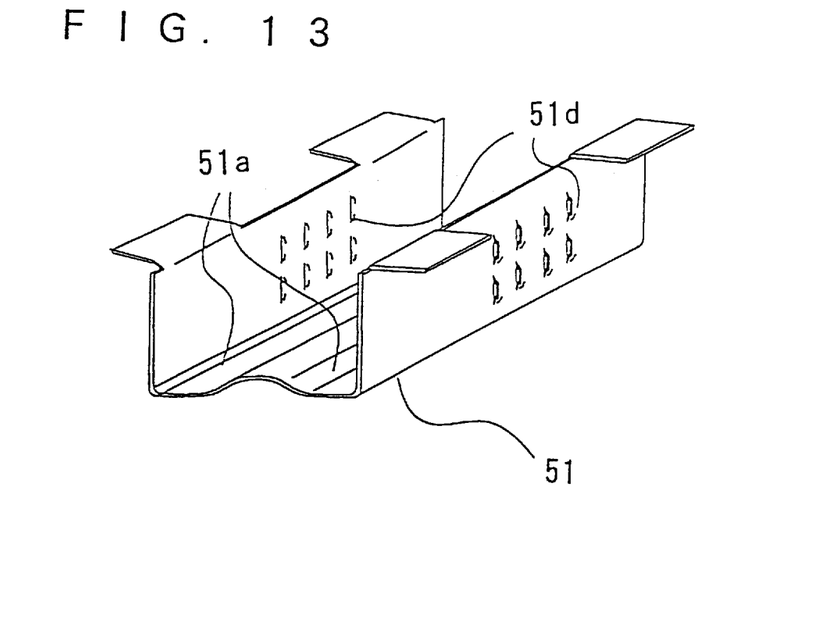
FIG. 13 is a perspective view showing a battery holding member used for a power supply unit in an another example of the present invention.

Moreover, as shown in FIG. 13, auxiliary refrigerant passages, similar to those in the power supply unit of Example 1, can be formed by providing ducts 51d for guiding a refrigerant inside the battery holding members 51 on the side walls 51c of battery holding members 51 exposed to the refrigerant passages. This structure further enhances the efficiency of cooling the cells.

The insulation layer coated on the surface of the metal battery holding member can be formed after the battery holding members are mutually joined and integrated. In particular, when mutually joining the battery holding members by welding, the insulation layer may be deteriorated or damaged by heat, and the insulation thereof may be lowered. Therefore, the insulation layer should preferably be formed after the battery holding members are joined.

A metallic material having higher heat conductivity wherein a thermal medium such as a chlorofluorocarbon is sealed can be used for the battery holding member. In addition, carbon steel can also be used as the base material of the battery holding member. In this case, the base material is subjected to rust inhibition treatment, such as Zn plating, Zn—Ni plating or Zn—Cr plating, and then an insulation layer is formed on the surface of the base material. Besides, alloy steel, such as a chromium steel or a stainless steel, can be used as the base material. When the stainless steel is used, it can be subjected to rust inhibition treatment when necessary. Moreover, the weight of the member can be decreased by using a light alloy, such as an aluminum alloy or a magnesium alloy.

The insulation layer can be made of a known material, such as a fluorocarbon resin, polyvinyl chloride or polyester.

As described above, the battery holding member made of a metal can have higher heat conductivity than the battery holding member made of a synthetic resin. Therefore, temperature difference among cells can be decreased, thereby reducing variations in charge/discharge and life characteristics and the like of cells due to temperature difference. Additionally, the material can have far greater mechanical strength, and can be improved in performance, such as shock resistance. What is more, since the material is superior in mechanical strength and processability, the shape of the battery holding member is not limited to the shapes described in the above-mentioned examples, but can have various shapes suited for applications. This significantly increases a degree of freedom in the design of the battery holding member.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

We claim:

1. A power supply unit comprising: a group of batteries including plural rows of cells arranged in parallel, each row of cells including plural cylindrical cells connected in series; and refrigerant passages for passing a refrigerant through space portions formed between said rows of cells, wherein said refrigerant passages includes:

main refrigerant passages exposed to said cells arranged in the row of cells; and auxiliary refrigerant passages, the upstream sides thereof being isolated from said rows of cells, and the downstream sides thereof being connected to said main refrigerant passages at positions corresponding to the midstream or downstream sides of said rows of cells.

2. The power supply unit in accordance with claim 1, wherein said auxiliary refrigerant passage is composed of a cylindrical container having: an external shape generally made identical to that of said row of cells; one closed end; and a through hole formed on the circumferential wall thereof, and said cylindrical containers are arranged in parallel with said rows of cells with said closed ends directed toward the downstream side of said refrigerant.

3. A power supply unit comprising: a group of batteries including plural rows of cells arranged in parallel, each row of cells including plural cylindrical cells connected in series; and cooling means for passing a battery cooling refrigerant through space portions formed between said rows of cells, wherein cross-sectional areas of the space portions among said rows of cells on the downstream side are made smaller than the cross-sectional areas of the space portions on the upstream side with respect to the flowing direction of said refrigerant.

4. A power supply unit comprising: a group of batteries including plural rows of cells arranged in parallel, each row of cells including plural cylindrical cells connected in series; and cooling means for passing a battery cooling refrigerant through space portions formed between said rows of cells, wherein surface areas of the cells exposed to said refrigerant on the downstream side of said rows of cells are larger than surface areas of said cells exposed to said refrigerant on the upstream side.

5. A power supply unit comprising: a group of batteries including plural rows of cells arranged in parallel at predetermined intervals, each row of cells including plural cylindrical cells connected in series; and cooling means for passing a battery cooling refrigerant through space portions formed between said rows of cells, wherein said interval between said rows of cells adjoining each other at the central portion of a cross-sectional plane perpendicular to the arrangement direction of said rows of cells is larger than the interval between said rows of cells adjoining each other at the peripheral portion.

6. The power supply unit in accordance with claim 5, wherein said power supply unit further comprises battery holding members for regularly arranging said rows of cells in parallel at predetermined positions, and said rows of cells are not accommodated at any given battery accommodation positions of said battery holding members to increase the spaces between said rows of cells at the central portion.

7. A heat radiation method of a power supply unit, applied to a power supply unit comprising a group of batteries including plural rows of cells arranged in parallel, each row of cells including plural cylindrical cells connected in series, comprising a step of:

passing a refrigerant through space portions formed between said rows of cells in the direction of said rows of cells in order to cool said cells in said rows of cells; and simultaneously passing a refrigerant only at positions corresponding to the midstream or downstream side of each row of cells and thereafter.

8. A heat radiation method of a power supply unit, applied to a power supply unit comprising a group of batteries including plural rows of cells arranged in parallel, each row of cells including plural cylindrical cells connected in series, comprising a step of passing a refrigerant through said rows of cells in the direction of said rows of cells, wherein surface areas of said cells exposed to said refrigerant on the upstream side of said rows of cells are made smaller than surface areas of said cells exposed to said refrigerant at positions corresponding to the midstream or downstream side of each row of cells and thereafter.

* * * * *